Patented Sept. 18, 1923.

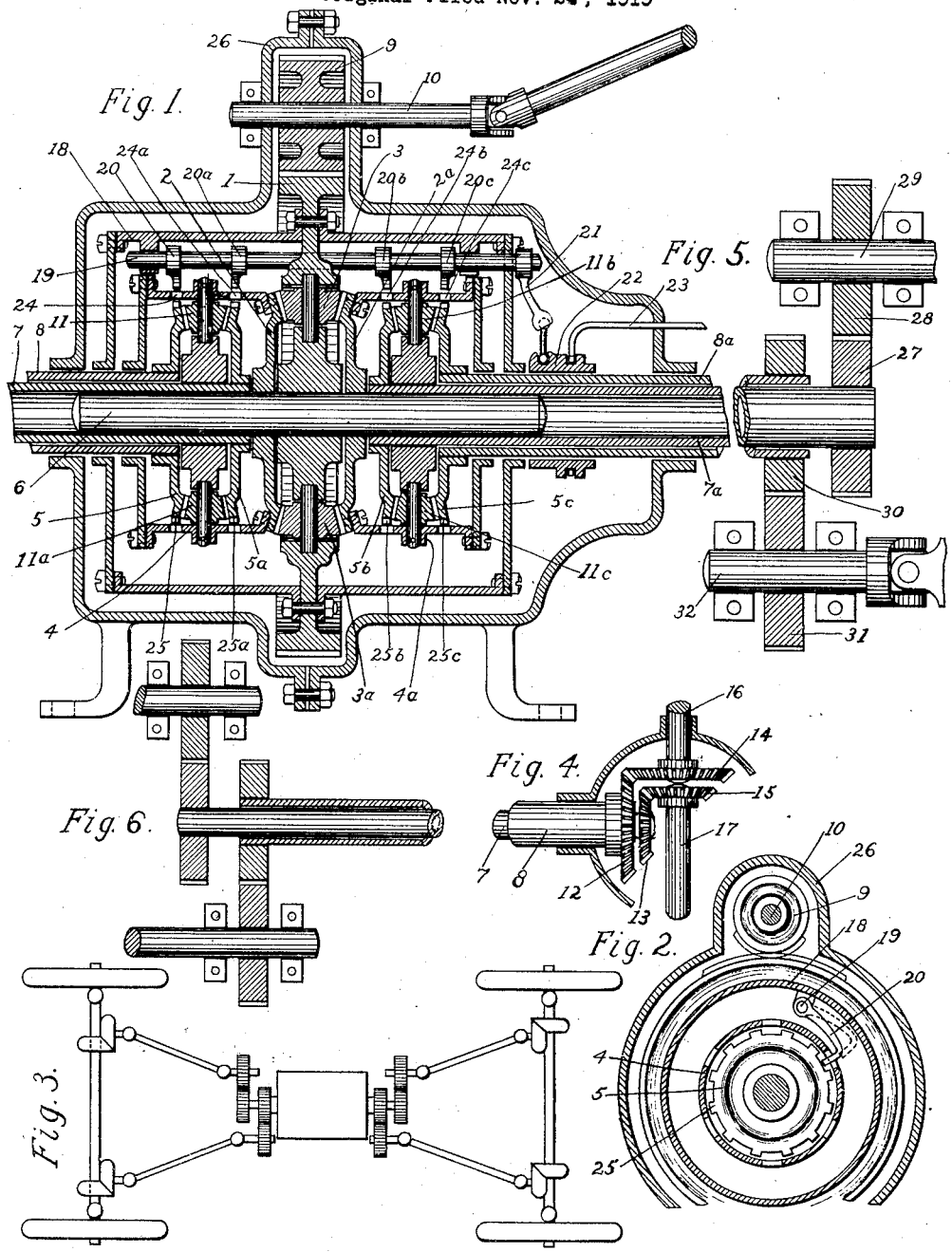

1,468,338

UNITED STATES PATENT OFFICE.

CHARLES O. WYMAN, OF ANOKA, MINNESOTA.

DIFFERENTIAL.

Application filed November 24, 1919, Serial No. 340,368. Renewed February 28, 1923.

*To all whom it may concern:*

Be it known that I, CHARLES O. WYMAN, a citizen of the United States, and a resident of the city of Anoka, in the county of Anoka and State of Minnesota, have invented certain new and useful Improvements in Differentials, of which the following is a specification.

My invention consists of a novel and useful improvement in differentials for automobiles, power trucks, tractors and any other desired place where the power can be located on the machine if desired, and applied to the four carrying wheels for propelling the machine.

My invention relates to that particular kind of differential which I use, which permits the differential being located on the driving shaft or any other desired place, and relieves the axles of that bungling encumbrance so usual in the ordinary automobile.

The machine consists of a triple locking differential, constructed with a central or main differential having a secondary differential located on its respective side gears or flanges and a locking device, whereby the secondary differentials are locked together as one, all located in the same case. The main differential balancing the drive of the two axles, while the secondary differential balances the drive of the carrying wheels on the respective axles.

I accomplish this by rigidly attaching the casings of the secondary differentials to the side flanges of the main differential and mounting the flanges of the secondary differentials on hollow shafts and allowing the hollow shaft of the inner flange to pass loosely out through the hollow shaft of the outer flange and connecting the respective hollow shafts with the four carrying wheels to propel the machine. I also use a locking device for locking the four flanges of the secondary differentials, so the four carrying wheels can be locked and propelled as one wheel.

I use various devices to accomplish this purpose, the construction of some are slightly different but all embody the same general principles, enough of which are illustrated in the drawings and described in the specifications to enable those skilled in the art to construct the same, while I have pointed out in the claims the full scope of my invention.

In the accompanying drawings forming a part of this specification—

Fig. 1 is sectional elevation of my differential.

Fig. 2 is cross sectional elevation of my differential showing locking device.

Fig. 3 is a plan view of one of the means for connecting my differential with the four carrying wheels.

Fig. 4 is a sectional view of another form of means for connecting the hollow shafts leading from the differential with the gears on the axles.

Figs. 5 and 6, are sectional plan views, showing manner of locating spur gears on the hollow shafts of the differential and their connections with the four propeller shafts which lead to the four carrying wheels as shown in Fig. 3.

In the drawings, 1 is the center of the main differential; 2 and $2^a$, are side flanges of the same; 3 and $3^a$ are its pinions.

I rigidly attach to the flanges 2 and $2^a$, housings 4 and $4^a$, for the secondary differentials. Within these housings I have located the two secondary differentials and designated their four flanges as 5, $5^a$, $5^b$, and $5^c$. I mount these on supporting shaft 6.

I mount flange $5^a$ on tubular shaft 7 and extend the shaft outwardly through flange 5 and tubular shaft 8 to be drivingly connected with gears on the axle to propel the machine. Flange 5 is mounted on tubular shaft 8 which is loosely mounted on tubular shaft 7 and extends in the same direction and in the same manner as shown in Figs. 3 and 4.

The opposite side of the differential is equipped in the same manner. I apply power to the differential by means of a spur gear located on the outside of the central member of the main differential and designated as 1. This gear is driven by pinion 9, located on shaft 10, which receives power from the motor. 11, $11^a$, $11^b$ and $11^c$, are pinions in the secondary differential.

Fig. 2 is cross sectional elevation of my differential, showing the locking device. In this construction I surround the secondary differential with the casing 18, which fits loosely around shafts 8 and $8^a$. I locate within the casing 18, rock shaft 19, with one end extending through the casing. I mount on rock shaft 19 four dogs 20, $20^a$, $20^b$, and $20^c$, which are capable of acting as dogs or pawls.

Rock shaft 19 extends through casing 18 far enough to afford a mount for the bell crank lever 21. Bell crank lever 21 is fitted with ball and socket at its elbow joint; also it has ball and socket joint at the end of its outer arm, which connects it with the sliding collar 22. Collar 22 has a groove in its outer end into which the operating rod 23 is fitted. As the operating rod 23 is moved backward and forward, the sliding collar 22 is carried with it, operating the bell crank lever 21, which, in turn, raises and lowers the dogs 20, 20$^a$, 20$^b$, and 20$^c$. I provide rectangular holes 24, *a*, *b*, and *c*, in the housing 4 and 4$^a$, suitable for the dogs 20, *a*, *b*, and *c*, to pass through and engage teeth 25, 25$^a$, 25$^b$, and 25$^c$, erected on the periphery of flanges 5, 5$^a$, 5$^b$, and 5$^c$. As the rock shaft 19 is turned, dogs 20, 20$^a$, 20$^b$, and 20$^c$, are forced through holes 24, engaging teeth 25. *a*, *b*, and *c*, locking the differential, which in turn locks the four carrying wheels and operates them together as one wheel. The dogs are so constructed that they can act as dogs or pawls; so the locking is the same whether going ahead or backward. I surround the whole with the housing 26.

Fig. 3 is plan view, showing location of the differential and its connections with the four carrying wheels for propelling the machine. It is thought that it is sufficiently plain and that it needs no description.

Fig. 4 illustrates the manner of connecting driving shafts from the differential to the axle. Tubular shafts 7 and 7$^a$ can be reduced from tubular to solid shafts after leaving the differential or continued as tubular. Tubular shaft 8 loosely encloses tubular shaft 7 and extends with it from the differential case to the gear case located on the axle. These shafts have bevel gears 12 and 13 mounted on them which intermesh with gears 14 and 15 mounted on driving axles 16 and 17. This allows the balancing drive from the differential to the carrying wheels. The opposite ends of the differential are equipped in like manner.

It will be observed that the same proportional difference exists between the gears 12 and 14 as does between the gears 13 and 15, and also that the driving axle is separated between the gears 14 and 15, so that the driving shafts 16 and 17 are entirely independent of each other in their driving operations, and it will be further observed that the propeller shaft 7 rolls loosely within propeller shaft 8 so that a perfect balancing drive is secured from the differential to the carrying wheels.

Fig. 5 is a sectional plan view, showing the manner of connecting the differential with the carrying wheels; in it gear 27 is mounted on tubular shaft 7$^a$. Gear 27 intermeshes with gear 28 mounted on shaft 29, which has driving connection with the carrying wheels as shown in Fig. 3. Gear 30 is mounted on tubular shaft 8$^a$, which is loosely mounted on tubular shaft 7$^a$ and turns with it while going straight ahead and back. But when the machine is making a curve, shaft 7$^a$ turns within shaft 8$^a$ sufficient to represent the difference in the travel of the outside wheel and the inner wheel. Gear 30 intermeshes with gear 31 mounted on shaft 32, which has driving connection with carrying wheels as shown in Fig. 3.

Fig. 6 is similar to Fig. 5, showing the driving connection of the opposite end of the differential, and it is thought unnecessary to further describe it.

It is thought that the use and operation of the machine will be thoroughly understood by those skilled in the art.

Various changes in the form proportions and minor details of my invention may be resorted to at will without departing from the spirit and scope thereof. Hence I consider myself entitled to all such variations as may lie within the intent of my claims.

I claim as my invention—

1. In a running gear of the automobile type, a triple differential constructed with a central or main differential, consisting of a middle member and its pinions together with two side gears or flanges, equalizing the drive of the front and rear axles, in combination with two secondary differentials equalizing the drive of the wheels on their respective axles, all located within the same case, said secondary differentials constructed on the flanges of the main differential.

2. A triple differential consisting of a main differential, having a middle member and two side flanges, equalizing the drive of the respective axles, with a secondary differential located on each flange of the main differential, equalizing the drive of the wheels on their respective axles; the secondary differentials being mounted on tubular concentric shafts, which extend in the same direction from the central differential, one tubular shaft mounted within the other.

3. In a triple differential, the combination, a primary differential, consisting of a middle section and two side flanges, with a secondary differential located on each of its respective flanges.

4. In a triple differential, the combination, a primary differential constructed with a middle section and two side flanges with a secondary differential, similarly constructed, located on each of its side flanges, said secondary differential having hollow concentric shafts, with their inner shafts passing out through their outer shafts.

5. In a differential, the combination, a main differential consisting of a central section and two side flanges, each of said flanges operating secondary differentials for balancing the drive of the carrying wheels on the respective axles, all located in the same case.

6. In a differential, the construction, a central section with its pinions intermeshing with gears on its side flanges, said flanges mounted on tubular concentric shafts extending in the same direction with one shaft loosely mounted within the other.

CHARLES O. WYMAN.

Witnesses:
JOHN P. COLEMAN,
G. H. WYMAN.